Aug. 19, 1941.  H. C. LORD  2,252,938
JOINT
Filed Feb. 17, 1939  2 Sheets-Sheet 1
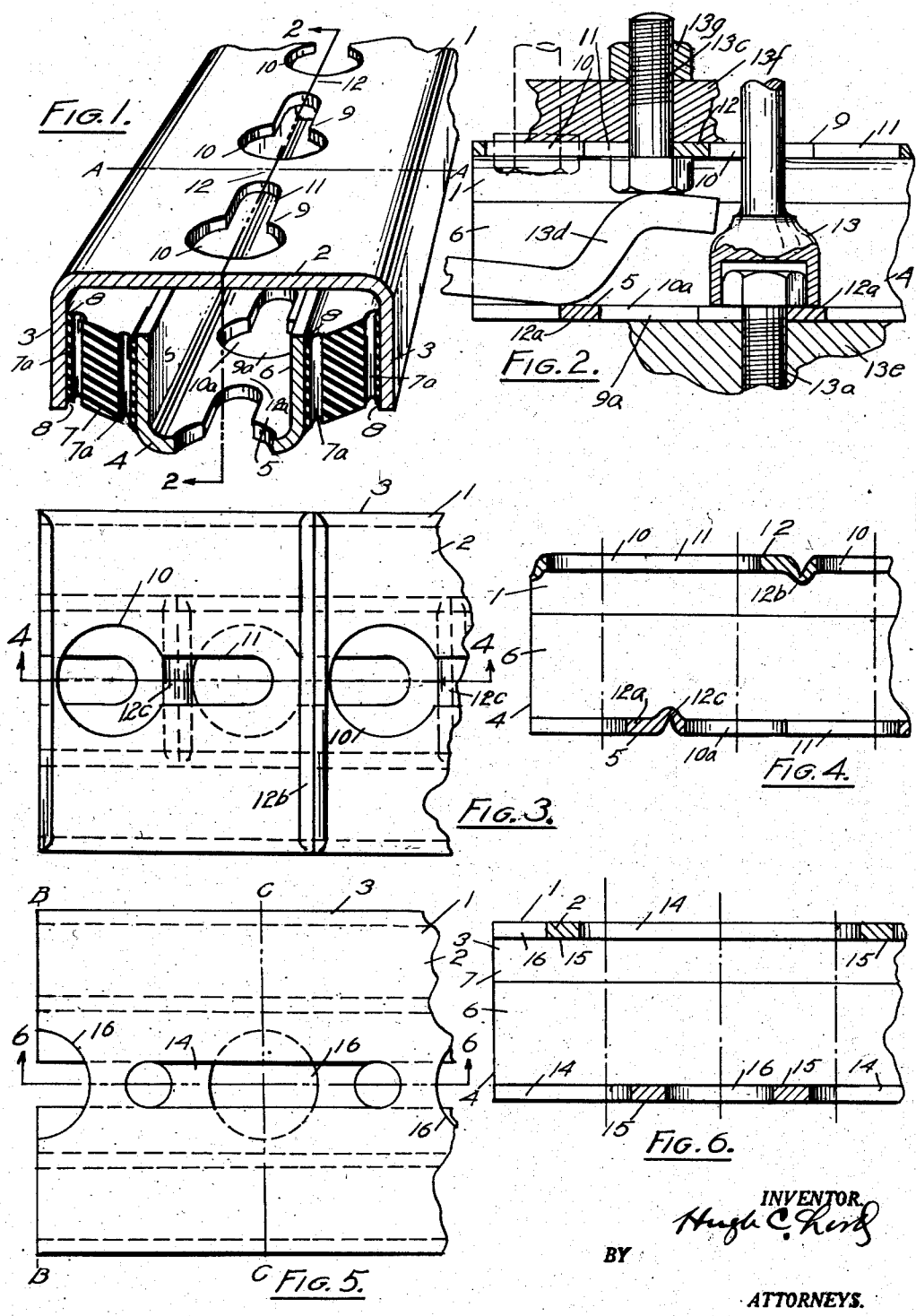
INVENTOR
Hugh C. Lord
BY
ATTORNEYS.

Aug. 19, 1941.  H. C. LORD  2,252,938
JOINT
Filed Feb. 17, 1939  2 Sheets-Sheet 2
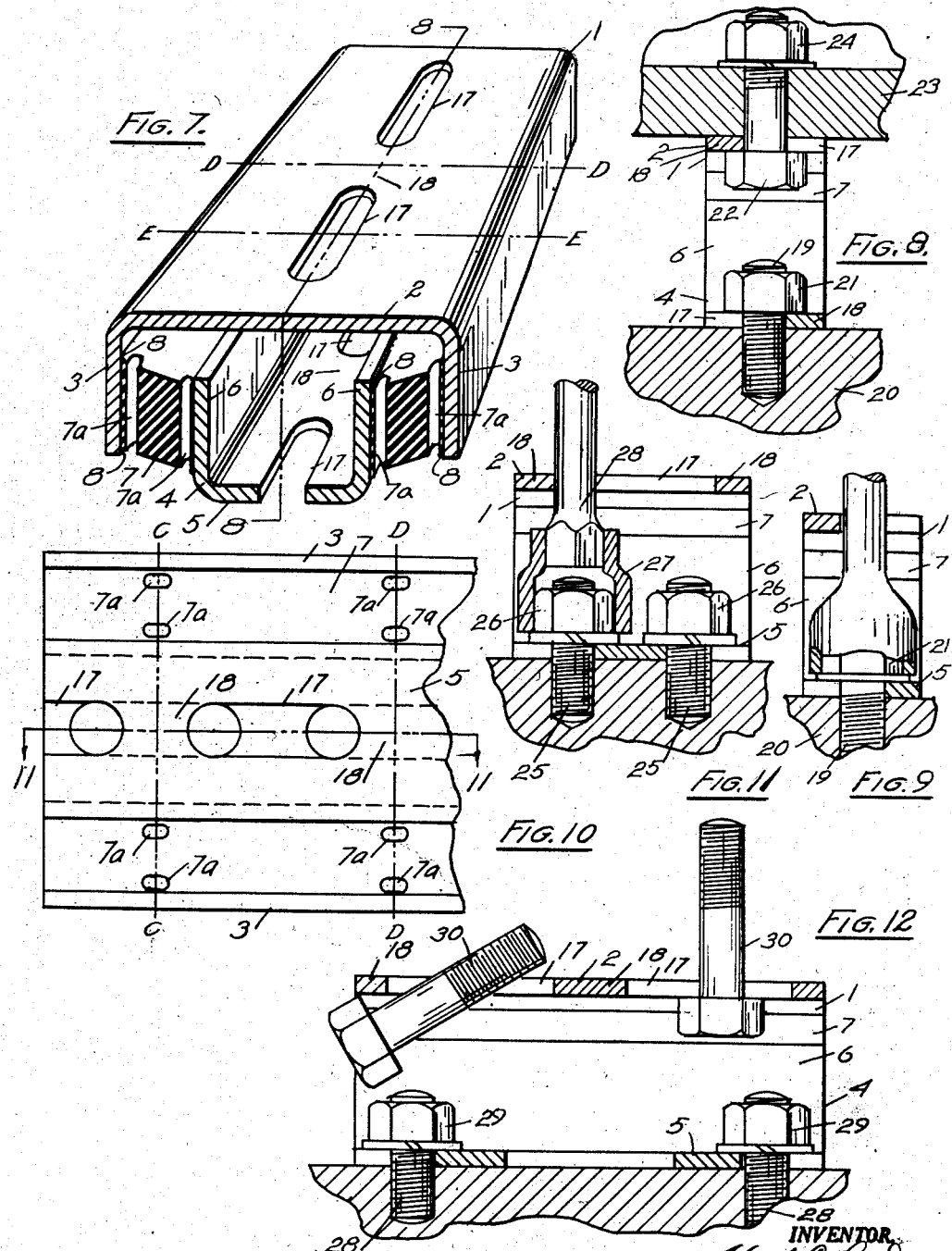
INVENTOR
Hugh C Lord
BY
ATTORNEYS.

Patented Aug. 19, 1941

2,252,938

UNITED STATES PATENT OFFICE 2,252,938

JOINT

Hugh C. Lord, Erie, Pa., assignor to Lord Manufacturing Company, Erie, Pa., a corporation of Pennsylvania Application February 17, 1939, Serial No. 257,020

10 Claims. (Cl. 248—358)

The present invention is directed to mountings which are adapted to be produced in elongated form, preferably in forms that may be severed to various lengths to satisfy the requirements. Such mountings have heretofore been made. This is designed to improve the performance of such mountings, their adaptability for attachment to supporting and supported members and their adaptability for severing into desired lengths.

In carrying out the invention, a mounting is provided in which the attachment to the supported and supporting members may preferably be accomplished within the confines of the side walls of the mounting, thus making the mounting more available as to space required, providing flexibility as to the points of attachment and adaptability as to installation for protection against the action of oils on the rubber portion of the mounting. Preferably in carrying out the invention, the wall supports are of channel form opposingly placed one within the other with openings along the cross web of the channels permitting the securing of each channel to its supported or supporting member and preferably providing means whereby the attaching devices in securing openings in the web of one channel may be manipulated through access openings of the opposing cross web. Features and details of the invention will appear from the specification and claims.

Preferred embodiments of the invention are illustrated in the accompanying drawings as follows:

Fig. 1 shows a perspective view of a mounting.

Fig. 2 a section on the line 2—2 in Fig. 1.

Fig. 3 a plan view of a modification.

Fig. 4 a section on the line 4—4 in Fig. 3.

Fig. 5 a plan view of a further modification.

Fig. 6 a section on the line 6—6 in Fig. 5.

Fig. 7 a perspective view of a further modification.

Fig. 8 a section on the line 8—8 in Fig. 7.

Fig. 9 a similar section showing manner of applying wrench to attaching bolt.

Fig. 10 a bottom view of the structure shown in Fig. 7.

Fig. 11 a section on the line 11—11 in Fig. 10 severed at C—C and D—D.

Fig. 12 a section along the line of 11—11 in Fig. 10 showing a longer section of joint.

In each of the structures as shown, the outer channel 1 has the cross web 2 and side flanges 3. The inner or narrower channel 4 has the cross web 5 and side flanges 6. These channels are formed in the usual manner, ordinarily of sheet metal. Rubber elements 7 bridge the space between the walls 3 and 6, the edges of the rubber being thinned at 8 along the edges of the bond for better assuring the security of the bond. The rubber element is vulcanized in place and consequently in the form shown is put under initial tension as the rubber shrinks in cooling. The rubber may be slightly inclined but preferably under all conditions, the rubber is uncompressed so as to be more sensitive to vibratory disturbances.

In the structure shown in Figs. 1 and 2, a series of keyhole slots 9 and 9a are arranged in the opposing cross webs 2 and 5 respectively. These slots in the opposing webs overlap, the larger opening 10 of the slots 9 being over the narrower portions 11a of the slots 9a and the larger portions 10a of the slots 9a being directly opposite the narrower portions 11 of the slots 9. With this arrangement it is possible to insert a bolt or nut through the larger portion and manipulate that bolt 13a or nut by a socket wrench 13 (see Fig. 2) extending through the larger opening to secure the mounting on a supporting member 13e. Similarly the larger opening in the other channel affords means for the entry of a bolt head of bolt 13c which may be moved into the narrower portion of the slot and temporarily secured there by a bar 13d while the supported member 13f is put in place and secured by nut 13g.

A bridge piece 12 is provided between each of the slots 9 and a similar piece 12a between the slots 9a. The mounting may be severed through the lines A—A extending through these bridge pieces leaving a bridge piece at the center of the opposing member of a joint so severed. Any multiples of these lengths may be obtained by severing at these points.

The rubber walls 7 are preferably provided with perforations 7a adjacent to the bonded surfaces of the walls 3 and 6. These perforations form thin portions of rubber adjacent the point of severance so that the bond at the point of severance is subjected to very little strain and in consequence the bond is more definitely assured against separation.

Either member 1 or 4 may be placed on top but ordinarily the larger member 1 is placed on top and forms a shield or protection from the rubber against the deposit of oil or any material that would injure the rubber. It will be noted in this structure the attaching bolts are entirely within the side confines or area defined by the side walls of the mounting consequently no added space is required for attaching the mounting and the complete attachment is provided by one line of screws. This simplifies the attachment and adapts the mounting for attachment in places where wider mountings are not easily placed. By providing the two channels definitely locating the side walls relatively to each other, a uniformity of rubber condition between the supporting walls is assured. This is important in that in many instances the vibratory conditions are such that a nice relation between the conditions encountered and the deflection of the rubber under such conditions may be definitely established or maintained so that the vibratory periods encountered may be properly damped by the rubber. The opposing channels provide clearance for the securing bolt heads so that no extra height is required for this purpose.

In the modification of Figs. 4 and 5, ribs 12b and 12c are forced into the metal along the bridge pieces 12 and 12a. This stiffens and strengthens the bridge pieces, thus permitting a shorter bridge piece to be used. The ribs form the lines of severance for the joint.

In Figs. 5 and 6 another modification is shown in which narrow slots 14 in the opposing channels are arranged in overlapping relation and the bridge pieces 15 between slots on each channel are provided with openings 16 by means of which attaching screws in the opposing slots may be manipulated. These parts are severed at B—B and C—C or multiples thereof. These slots permit also of the attaching arrangement of Figs. 8 and 9.

In Figs. 7 to 12 another modification is shown. In these figures the channels are provided with a narrow slot 17, the slots on the opposing cross webs being staggered so that the slots overlap. Bridge pieces 18 are provided between the slots. This structure makes possible shorter joints as for instance with the severance at the points D—D and E—E where this is done a stud such as 19 can be placed through the severed slot at the bottom and extend into the support 20. A nut 21 can be set up on the stud with a socket wrench. The shank of a socket wrench (Fig. 9) may be introduced through the slot at the top and brought into alignment with a nut so as to set up the nut. A bolt 22 may be extended through the slot at the top into a support 23 and secured by a nut 24. The overlapping slots therefore permit of getting to the bolts for manipulation as just described and also permits of bringing these attaching bolts into direct alignment so that side pressure will have no tendency to turn the mounting.

The mounting shown in Fig. 10 may be also severed on the lines D—D and C—C, that is in adjoining bridge pieces. This makes the severed joint as shown in Fig. 11. Here two studs 25 may be arranged in the slots opening at the end at the bottom. The nuts 26 on said studs may be handled by a socket 27 reached by a shank 28 through the top slot.

In Fig. 12 a longer joint is shown where two slots are included in the top channel and the point of severance through the bridges is at the ends of these slots. This makes open slots at the ends of the bottom member in which studs 28 may be placed and secured by nuts 29 operated from the ends of the channel. Bolts 30 may be introduced as indicated in the top channel and held there temporarily while the supported member is attached.

The structure shown in Fig. 1 gives greater flexibility in the handling of the securing bolts at different points in lengths of a long mounting whereas in Fig. 7 the structure provides a structure in which the shortest individual joints may be severed.

What I claim as new is:

1. A joint assembly having strips providing opposing walls with opposing inturned portions, and resilient material such as rubber secured to and bridging the space between said walls; said inturned portions having offset and overlapping elongated slots related to place a securing area of a slot in one inturned portion under an access area in an opposing slot in the opposing inturned portion.

2. A joint assembly having strips providing opposing walls with opposing inturned portions, and resilient material such as rubber secured to and bridging the space between said walls; said opposing inturned portions having pairs of opposing openings for securing and giving access to a securing means in a securing opening of an opposite inturned portion, the openings of each pair being related to place a securing area of an opening opposite an access area of an opposing opening, the access area extending beyond the securing area opposing the access area.

3. A joint assembly having strips providing opposing walls with opposing inturned portions, and resilient material such as rubber secured to and bridging the space between said walls; said opposing inturned portions having pairs of opposing openings for securing and giving access to a securing means in a securing opening of an opposite inturned portion, the openings of each pair having a securing area and an offset access area opposite the securing area of the opposing opening of the pair.

4. A joint assembly having opposing channels, one narrower than the other and placed with the openings of the channels toward each other, and resilient material such as rubber secured to and bridging the space between the side flanges of the channels; the cross webs of said channels being provided with offset and overlapping elongated slots related to place a securing area of a slot in one cross web under an access area of an opposing slot in the opposing cross web.

5. A joint assembly having opposing channels, one narrower than the other and placed with the openings of the channels toward each other, and resilient material such as rubber secured to and bridging the space between the side flanges of the channels; the cross webs of said channels having pairs of opposing openings for securing and giving access to a securing means, the openings of each pair being related to place a securing area of an opening opposite an access area of the companion opening of the pair, the access area extending beyond the securing area.

6. A joint assembly having opposing channels, one narrower than the other and placed with the openings of the channels toward each other, and resilient material such as rubber secured to and bridging the space between the side flanges of the channels; the cross webs of said channels having pairs of opposing openings having access and securing areas, each access area of each pair giving access to an opposing securing area of the companion opening of the pair.

7. A joint assembly having strips providing opposing walls with opposing inturned portions, and resilient material such as rubber secured to and bridging the space between said walls; said inturned portions having offset and overlapping elongated slots related to place a securing area of a slot in one inturned portion in register with an access area of an opposing slot, the access area being enlarged to a greater width than the balance of the slot.

8. A joint assembly having opposing channels, one narrower than the other and placed with the openings of the channels toward each other, and resilient material such as rubber secured to and bridging spaces between the side flanges of the channel; the cross webs of said channels being provided with elongated and opposed offset and overlapping access and securing openings, each opening having a narrow portion and an enlarged portion, the enlarged portion being opposite the narrow portion of the opposing overlapping opening.

9. A joint assembly having opposing channels, one narrower than the other and placed with the openings of the channels toward each other, and resilient material such as rubber secured to and bridging spaces between the side flanges of the channels; the cross webs of the channel being provided with opposed access and securing openings, one of the openings at least being in the form of a keyhole slot, the enlarged portion of the keyhole slot giving access to an opposing securing opening.

10. A joint assembly having strips with spaced and opposing walls; and means formed of resilient material such as rubber bridging the space between said walls and bonded thereto, the means presenting therein portions adjacent the bond and intermediate the ends of the strips providing points of severance of the strip through thin portions of the rubber adjacent to the bond at the point of severance.

HUGH C. LORD.